United States Patent
Nakai et al.

(10) Patent No.: US 11,519,805 B2
(45) Date of Patent: Dec. 6, 2022

(54) VACUUM GAUGE

(71) Applicant: HORIBA STEC, Co., Ltd., Kyoto (JP)

(72) Inventors: Junya Nakai, Kyoto (JP); Sotaro Kishida, Kyoto (JP)

(73) Assignee: HORIBA STEC, CO., LTD., Kyoto (JP)

( * ) Notice: Subject to any disclaimer, the term of this patent is extended or adjusted under 35 U.S.C. 154(b) by 93 days.

(21) Appl. No.: 17/178,621

(22) Filed: Feb. 18, 2021

(65) Prior Publication Data
US 2021/0278303 A1    Sep. 9, 2021

(30) Foreign Application Priority Data

Mar. 5, 2020  (JP) .............................. JP2020-037515

(51) Int. Cl.
*G01L 19/04* (2006.01)
*G01L 21/00* (2006.01)

(52) U.S. Cl.
CPC .............. *G01L 19/04* (2013.01); *G01L 21/00* (2013.01)

(58) Field of Classification Search
CPC ................................ G01L 19/04; G01L 21/00
USPC ........................................................... 73/708
See application file for complete search history.

(56) References Cited

U.S. PATENT DOCUMENTS

| | | | |
|---|---|---|---|
| 5,625,152 A * | 4/1997 | Pandorf | G01L 9/0072 73/756 |
| 6,612,176 B2 * | 9/2003 | Poulin | G01L 9/0075 73/708 |
| 7,000,479 B1 * | 2/2006 | Poulin | G01L 19/04 73/708 |
| 7,946,178 B2 * | 5/2011 | Hanselmann | G01L 19/0636 73/706 |
| 2006/0070447 A1 * | 4/2006 | Agami | G01L 19/04 73/708 |
| 2009/0114029 A1 * | 5/2009 | Ide | G01L 19/0092 73/724 |
| 2014/0216127 A1 * | 8/2014 | Kimura | G01L 9/04 73/1.57 |
| 2018/0283971 A1 * | 10/2018 | Kishida | G01L 9/0072 |

(Continued)

FOREIGN PATENT DOCUMENTS

| | | | | |
|---|---|---|---|---|
| JP | 3100986 | | 10/2000 | |
| WO | WO-2007019714 A1 * | 2/2007 | | G01L 9/0079 |

*Primary Examiner* — Nimeshkumar D Patel
*Assistant Examiner* — Jean F Morello
(74) *Attorney, Agent, or Firm* — Greenblum & Bernstein, P.L.C.

(57) ABSTRACT

In a vacuum gauge that controls a temperature of a sensor section to a high temperature, a circuit board can be sufficiently cooled without applying air to the vacuum gauge from outside. The vacuum gauge includes a sensor section that communicates with a measurement space via a connection port and outputs an output signal according to a pressure in the measurement space, a heater provided around the sensor section to heat the sensor section, a circuit board arranged on a side opposite to the connection port with respect to the sensor section, a first inner case that accommodates the sensor section and the heater, a second inner case that accommodates the circuit board, and an outer case that surrounds the first inner case and the second inner case and forms a flow path, through which outside air flows, together with the first inner case and the second inner case.

9 Claims, 5 Drawing Sheets

(56) References Cited

U.S. PATENT DOCUMENTS

| | | | |
|---|---|---|---|
| 2019/0162618 A1* | 5/2019 | Kishida | G01L 27/002 |
| 2020/0166425 A1* | 5/2020 | Kawase | G01L 19/142 |

* cited by examiner

VACUUM GAUGE

BACKGROUND

Technical Field

The present invention relates to a vacuum gauge used to monitor, for example, a degree of vacuum in a vacuum chamber.

Related Art

In recent years, with the miniaturization of semiconductor manufacturing processes, a wide variety of material gases have been introduced into vacuum chambers. In the new material gases, there are many low vapor pressure materials that have extremely low vapor pressure compared to conventional material gases.

When such a low vapor pressure material is cooled, for example, in a sensor section of a vacuum gauge, a part of the material condenses and causes dew condensation, and its components are deposited. This results in problems such as reduction of the sensitivity to pressure and shortening of the life of the sensor section.

Therefore, as a conventional vacuum gauge, as shown in JP 3100986 B2, there is a high temperature control vacuum gauge in which a heater is provided around the sensor section to control the temperature of the sensor section to a high temperature, in order to stably gasify a low vapor pressure material.

In such a high temperature control vacuum gauge, when a circuit board that sends and receives signals to and from the sensor section is exposed to a high temperature, the heat resistant temperature of various electronic components mounted on the circuit board may be exceeded. Therefore, in JP 3100986 B2, vents are formed in a casing at positions slightly lower and slightly higher than the circuit board to generate an air flow around the circuit board.

However, even if such vents are formed, there is almost no temperature difference between the slightly lower position and the slightly higher position of the circuit board, and in reality, an air flow sufficient to cool the circuit board does not occur. From this, the higher the temperature of the sensor section is, the more the circuit board cannot be kept below the heat resistant temperature in the above-described configuration.

In order to sufficiently cool the circuit board, it is considered to blow air to the vacuum gauge using, for example, a blower. In this case, however, a temperature distribution may occur in the sensor section, which may affect the output stability. There are also other problems for users, such as equipment changes and usage restrictions.

PRIOR ART DOCUMENT

Patent Document JP 3100986 B2

SUMMARY

The present invention has been made to solve the above problems at once. It is an object of the present invention to sufficiently cool a circuit board without applying air from outside to a vacuum gauge that controls the temperature of a sensor section to a high temperature.

A vacuum gauge according to the present invention has a sensor section that communicates with a measurement space via a connection port and outputs an output signal corresponding to a pressure in the measurement space, a heater provided around the sensor section to heat the sensor section, a circuit board arranged on a side opposite to the connection port with respect to the sensor section, a first inner case that accommodates the sensor section and the heater, a second inner case that accommodates the circuit board, and an outer case that surrounds the first inner case and the second inner case and forms a flow path, through which outside air flows, together with the first inner case and the second inner case.

According to the vacuum gauge configured in this way, the flow path through which the outside air flows is formed from between the first inner case that accommodates the heater and the sensor section whose temperature is controlled to a high temperature and the outer case to between the second inner case that accommodates the circuit board and the outer case. Thus, a large temperature difference can be generated between an upstream and a downstream of this flow path.

Since an air density gradient is generated between the upstream and the downstream of the flow path, cold air can be pushed up toward the circuit board by utilizing a so-called chimney effect. As a result, the circuit board can be sufficiently cooled without applying air to the vacuum gauge from outside.

It is preferable that an outside air intake port of the flow path faces downward in a mounting posture in which the circuit board is mounted so as to be located above the sensor section.

In this case, as compared with the configuration in which the outside air intake port faces sideways, the outside air can be easily taken in and a stronger updraft can be generated to increase the cooling effect of the circuit board.

Meanwhile, if the outside air intake port is too close to the measurement space, depending on the mounting environment of the vacuum gauge, a chamber forming the measurement space or a member near the chamber, for example, may hinder the intake of the outside air, making it difficult to take in the outside air.

Therefore, it is preferable that the outside air intake port is located above a lower end of the first inner case in the mounting posture.

With such a configuration, the outside air can be sufficiently taken in regardless of the mounting environment of the vacuum gauge.

As a specific embodiment for locating the outside air intake port below the lower end of the first inner case, a lower end of the outer case is located above the lower end of the first inner case in the mounting posture, and a downward-facing opening of the outer case, located outside the outer peripheral surface of the first inner case, is formed as the outside air intake port.

It is preferable that the outer case has a tubular shape with a rectangular cross section or a polygonal cross section, the second inner case is provided along a plurality of sides of the outer case, and the circuit board is supported along an inner peripheral surface of the second inner case.

With such a configuration, a contact area between the flow path formed by the second inner case and the outer case and the circuit board can be increased, and the cooling effect on the circuit board can be further improved.

It is preferable that the first inner case is made of a material having a lower thermal conductivity than the second inner case and the outer case.

In this case, the first inner case can exert the heat retaining function upon the sensor section, and the second inner case and the outer case can exert the heat dissipation function upon the circuit board. These functions can also cool the circuit board while controlling the temperature of the sensor section to a high temperature.

In order to fully exert the above-mentioned chimney effect, it is preferable that the outer case has a tubular shape, and a vent that again discharges outside air flowing through the flow path to outside is provided in a lid that closes an opening, of the outer case, facing a side opposite to the connection port.

In order to exert the chimney effect more prominently, it is preferable that a vent that again discharges the outside air flowing through the flow path to outside is further provided in the outer case at a position facing the second inner case.

Further, the vacuum gauge according to the present invention includes a sensor section that communicates with a measurement space via a connection port and outputs an output signal according to a pressure in the measurement space, a heater provided around the sensor section to heat the sensor section, a circuit board arranged on a side opposite to the connection port with respect to the sensor section, and an outer case that forms a flow path, through which outside air flows, around the sensor section and the circuit board.

According to the vacuum gauge configured in this way, the flow path through which the outside air flows is formed from a periphery of the heater and the sensor section whose temperature is controlled to a high temperature to a periphery of the circuit board. Thus, a large temperature difference can be generated between an upstream and a downstream of this flow path.

Since an air density gradient is generated between the upstream and the downstream of the flow path, cold air can be pushed up toward the circuit board by utilizing a so-called chimney effect. As a result, the circuit board can be sufficiently cooled without applying air to the vacuum gauge from outside.

According to the present invention configured in this way, even if the temperature of the sensor section is controlled to about 200° C., for example, and the environmental temperature is about 50° C., the circuit board can be sufficiently cooled to its heat resistant temperature or below without applying air to the vacuum gauge from outside.

DETAILED DESCRIPTION

Hereinafter, an embodiment of the vacuum gauge according to the present invention will be described with reference to the drawings.

Figure 1:
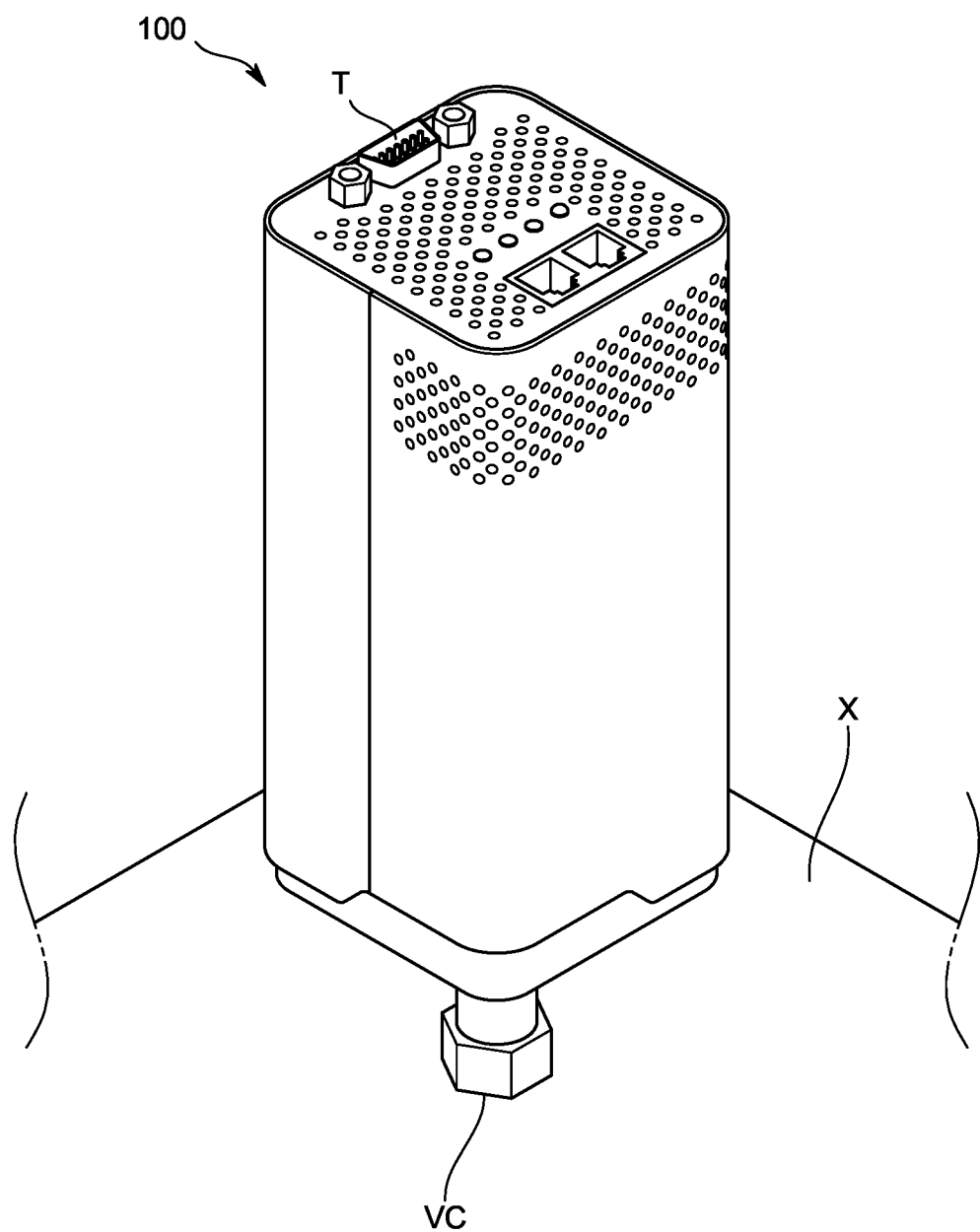
FIG. 1 is a schematic perspective view showing a vacuum gauge according to an embodiment of the present invention.

As shown in FIG. 1, a vacuum gauge 100 of the present embodiment is used for monitoring a degree of vacuum in a vacuum chamber X, which is a measurement space where, for example, film formation is performed in a semiconductor process. The vacuum gauge 100 is attached to the outside of a partition wall of the vacuum chamber X via a joint VC, and is connected so as to communicate with the inside of the vacuum chamber X.

Specifically, this vacuum gauge 100 is a roughly rectangular parallelepiped gauge in which a connection port P communicating with the measurement space is provided at a tip end, and an output terminal T for outputting a measured pressure value to the outside is provided at a base end.

Figure 2:
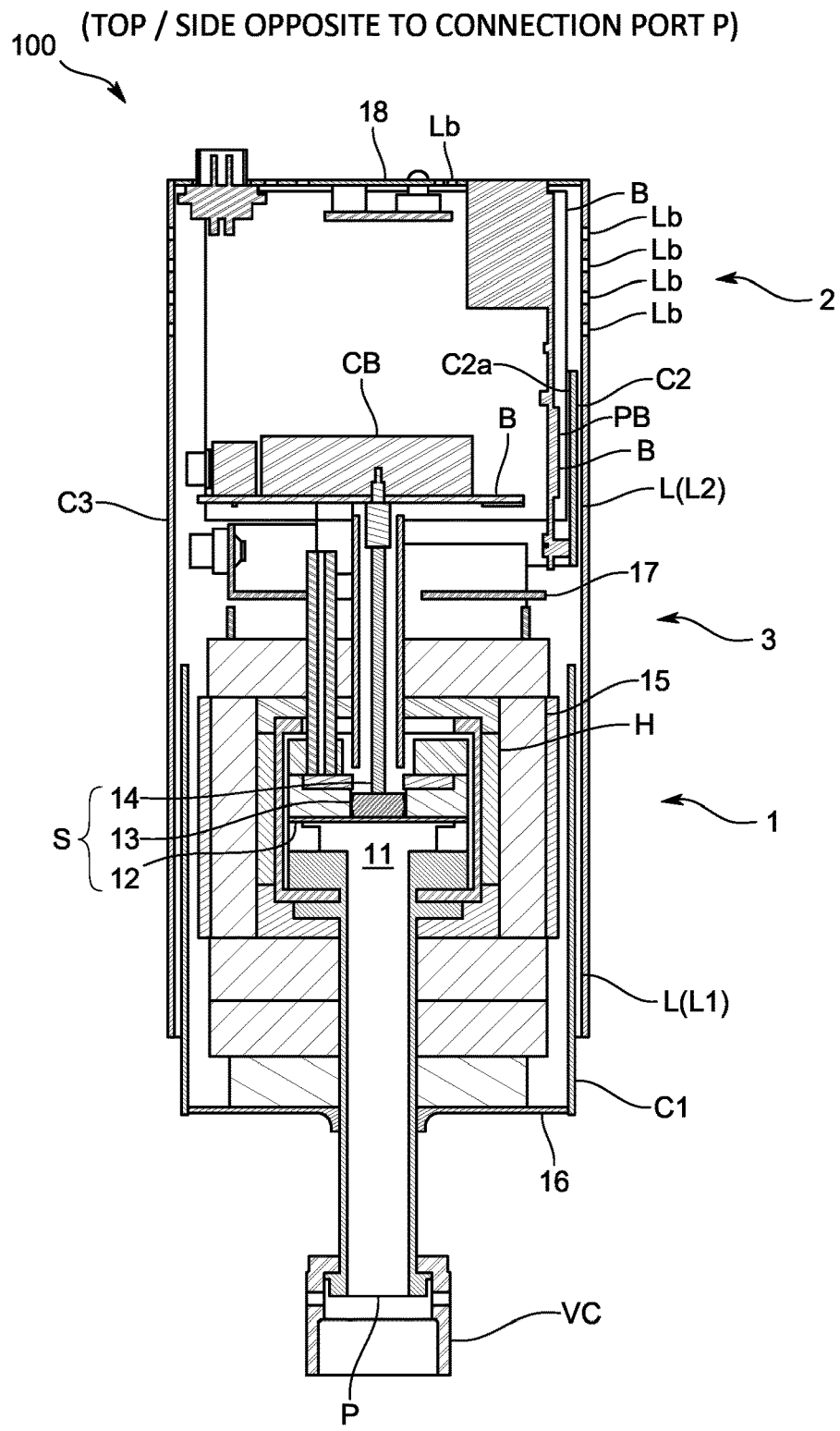
FIG. 2 is a schematic cross-sectional view showing an internal configuration of the vacuum gauge according to the embodiment.

As shown in a cross-sectional view of FIG. 2, the vacuum gauge 100 at least includes a sensor module 1 provided on the tip end side (joint VC side/connection port P side) and communicating with an atmosphere in the vacuum chamber X, and a main body module 2 provided on the base end side and exchanging various signals with the sensor module. As shown in FIG. 2, the vacuum gauge 100 of the present embodiment further includes a heat insulation module 3 provided between the sensor module 1 and the main body module 2 to prevent heat generated in the sensor module 1 from being transferred to the main body module 2.

Hereinafter, each of the modules 1 to 3 will be described.

<Sensor Module 1>

As shown in FIG. 2, the sensor module 1 includes a sensor section S that outputs an output signal according to a pressure in the vacuum chamber X, and a heater H that heats the sensor section S.

The sensor section S is a capacitance type diaphragm pressure detection mechanism, and includes an introduction space 11 in which the atmosphere in the vacuum chamber X is introduced through the joint VC, a diaphragm 12 that partitions between the introduction space 11 and a side of reference pressure such as atmospheric pressure, a detection electrode 13 arranged facing the diaphragm 12, and an output electrode 14 that outputs to the main body module 2 a potential of the detection electrode 13 as an output signal.

The diaphragm 12 has a thin film disk shape, and its outer peripheral portion is sandwiched and supported by a sandwiching body. When the pressure in the vacuum chamber X changes, the film is deformed due to a pressure difference between both faces of the diaphragm 12. A material gas component introduced into the vacuum chamber X also flows into the introduction space 11 side of the diaphragm 12, where the gas may adhere, condense, and accumulate.

A slight gap is formed between the detection electrode 13 and the diaphragm 12, and deformation of the diaphragm 12 changes a separation distance between a detection surface of the detection electrode 13 and a central portion of the diaphragm 12. The detection electrode 13 detects a change in capacitance due to this change in the separation distance as a change in potential.

The heater H is provided around the sensor section described above, and is specifically, for example, a film heater H configured to change its set temperature according to an amount of applied voltage or current.

As shown in FIG. 2, the heater H here is arranged so as to extend toward the tip end side and the base end side with the diaphragm 12 at the center so that the temperature of the diaphragm 12 is mainly maintained at a desired temperature. Further, an insulator 15 is provided on an outer peripheral side of the heater H for heat insulation.

In such a configuration, the sensor section S and the heater H described above are housed in a casing C1 (hereinafter referred to as a first inner case C1).

The first inner case C1 has a tubular shape in which its opening on the joint VC side is closed by a lid 16 and its opening on the sensor section S side is open. Here, the cross section is rectangular. The first inner case C1 of the present embodiment is made of, for example, SUS having a low thermal conductivity in order to exert a heat retaining function upon the sensor section S heated by the heater H.

<Main Body Module 2>

The main body module 2 includes a circuit board B provided with a circuit for exchanging signals with at least one of the sensor section S or the heater H described above.

The circuit board B of the present embodiment includes a pressure calculation circuit PB that calculates a pressure value based on an output signal of the sensor section S, and a heater control circuit CB that supplies power to and controls the heater H. Although FIG. 2 shows an example of the arrangement of the pressure calculation circuit PB and the heater control circuit CB, the arrangement of these circuits PB and CB is not limited to this and may be changed as appropriate.

The pressure calculation circuit PB and the heater control circuit CB are equipped with a so-called microcomputer including input/output means such as a CPU, a memory, an A/D converter, and a D/A converter, and a program stored in the memory is executed to realize the function by cooperating with various devices.

The pressure calculation circuit PB calculates a pressure value in the vacuum chamber X based on a voltage value indicated by the output signal output from the sensor section S. Specifically, the pressure calculation circuit PB is, for example, a circuit configured to calculate the pressure value by further using calibration data stored in a calibration data storage unit (not shown).

The heater control circuit CB receives a temperature set by, for example, an external input from a user, and performs feedback-control of a voltage value or a current value applied to the heater H so as to reach the set temperature. In the present embodiment, a set temperature range accepted by the heater control circuit CB is set between 100° C. or higher and 200° C. or lower. This is set according to a range of condensation temperatures of a material gas that may be introduced into the vacuum chamber X. In other words, the user can select an appropriate temperature at which condensation and decomposition do not occur and use it as the set temperature according to the type of material gas introduced into the vacuum chamber X.

Figure 3:
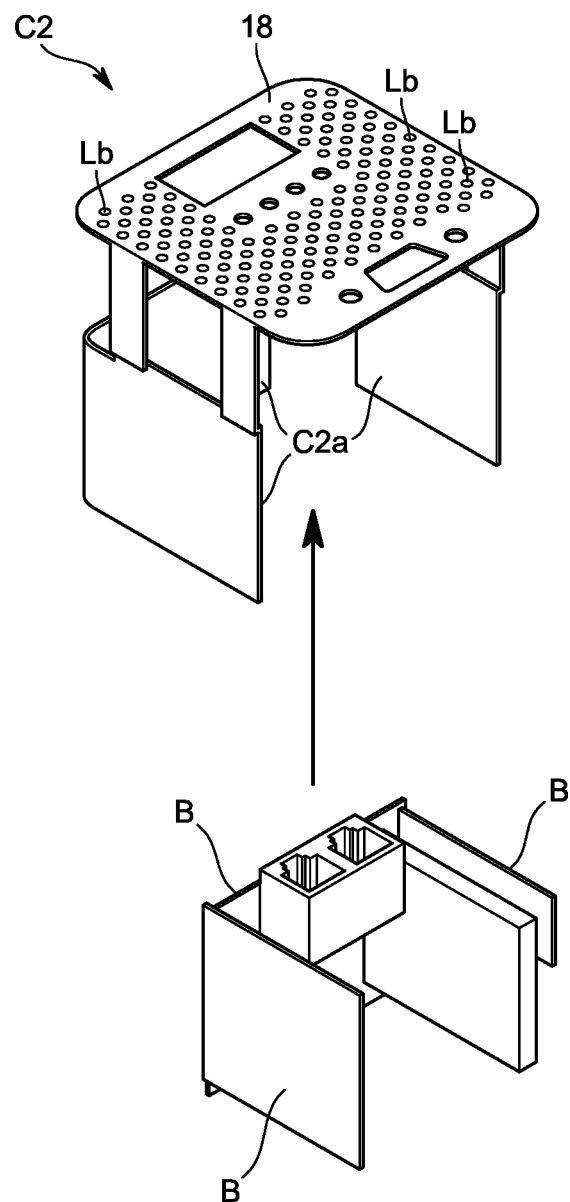
FIG. 3 is a schematic perspective view showing a second inner case of the embodiment.

In such a configuration, the circuit board B described above is housed in a casing C2 (hereinafter referred to as a second inner case C2) shown in FIGS. 2 and 3.

The circuit board B is provided along an inner peripheral surface C2a of the second inner case C2, and here, for example, the circuit board B is supported via a screw. Specifically, the second inner case C2 has, for example, a tubular shape whose cross section is rectangular or partially rectangular. In this embodiment, the cross section is U-shaped. With this configuration, a part or the whole of the circuit board B is bent along the inner peripheral surface C2a of the second inner case C2, and here, the cross section of the circuit board B is U-shaped.

The second inner case C2 of the present embodiment is made of, for example, aluminum, which is a material having at least higher thermal conductivity than the first inner case C1 described above, in order to exert the heat dissipation function upon the circuit board B.

<Heat Insulation Module 3>

As shown in FIG. 2, the heat insulation module 3 has a heat insulating space for heat insulation while separating the sensor module 1 and the main body module 2 with a predetermined distance. The heat insulation module 3 is provided with a heat insulating partition member 17 that divides the heat insulating space into the sensor module 1 side and the main body module 2 side. This makes it difficult for the heat generated by the heater H in the sensor module 1 to be transferred to the main body module 2.

Since the sensor module 1 and the main body module 2 are separated from each other by the heat insulation module 3, a plurality of connectors are provided in this heat insulation module 3 to connect the sensor module 1 and the main body module 2 for signal transmission/reception and power supply.

<Chimney Effect of the Vacuum Gauge 100>

Figure 4:
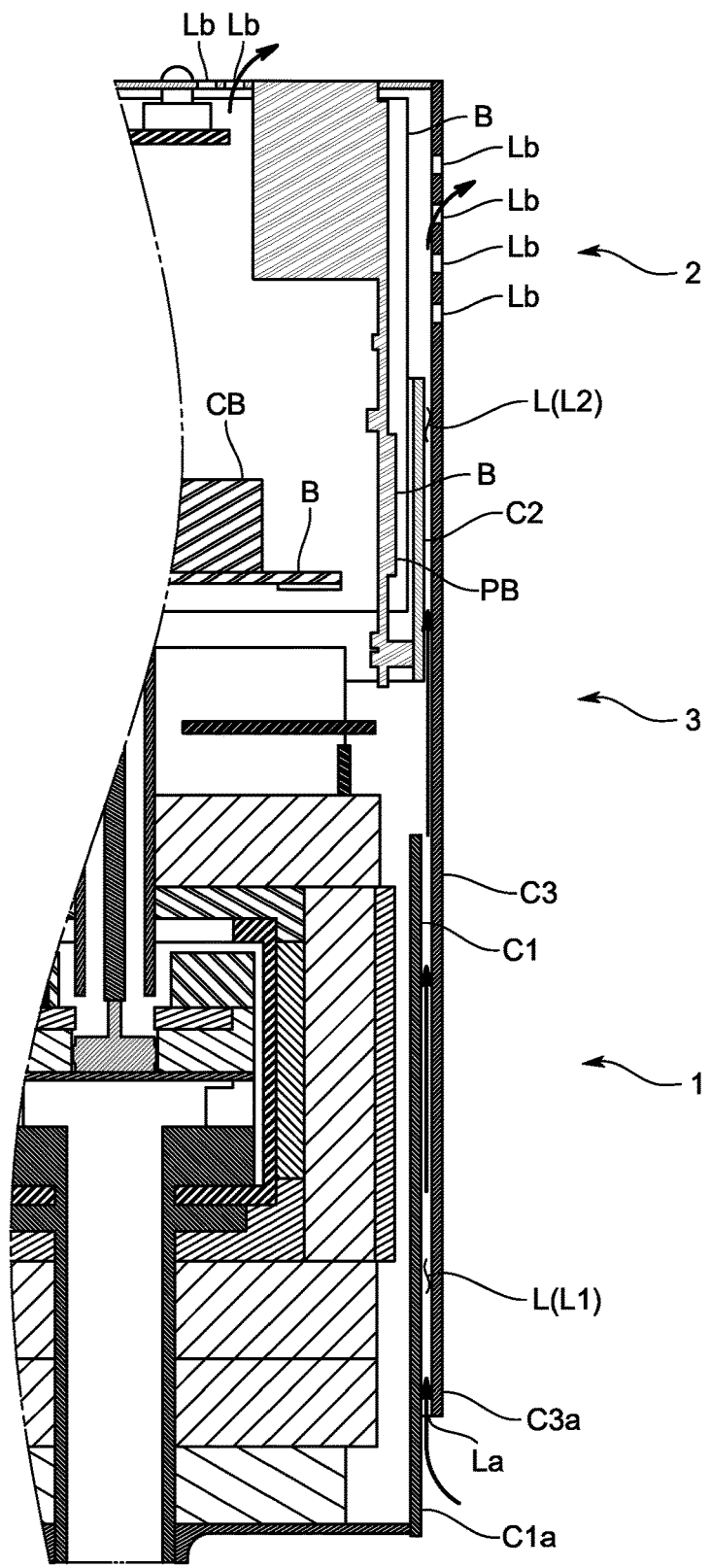
FIG. 4 is a schematic cross-sectional view showing a configuration of a flow path formed in the vacuum gauge of the embodiment.

As particularly shown in FIG. 4, the vacuum gauge 100 of the present embodiment further includes an outer case C3 that surrounds the first inner case C1 and the second inner case C2 described above, and forms a flow path L, through which the outside air flows, together with the first inner case C1 and the second inner case C2. This flow path L is configured to exert a chimney effect.

More specifically, the outer case C3 has a tubular shape that forms the outer peripheral surface of the vacuum gauge 100, and here, the outer case C3 has a tubular shape with a rectangular cross section whose one end and the other end are open. This outer case C3 is made of a material with high thermal conductivity to exert a heat dissipation function because the outer case C3 is held by the user. For example, the outer case C3 is made of aluminum, similarly to the second inner case C2, which has higher heat conductivity than the first inner case C1.

The outer case C3 is attached to the first inner case C1 and the second inner case C2 with a space therebetween. In other words, the outer case C3 is separated in the radial direction, and this space forms the above-mentioned flow path L through which the outside air flows.

This flow path L is formed along the vertical direction in the mounting posture of the vacuum gauge 100 (mounting posture shown in FIGS. 1 and 2) in which the circuit board B is located above the sensor section S. As a result, in the flow path L, outside air around the heater H and the sensor section S controlled to a high temperature (that is the downstream of the flow path L) is warmed up, compared with that around the circuit board B (that is the upstream of the flow path L). As a result, a large temperature difference occurs between the upstream and downstream of the flow path L. Accordingly, an air density gradient is generated between the upstream and the downstream of the flow path L to exert the chimney effect and raise the warmed air in a lower part. In other words, the space between the outer case C3 and the first inner case C1 is formed as an upstream flow path L1, and the space between the outer case C3 and the second inner case C2 is formed as a downstream flow path L2.

The upstream flow path L1 is provided so as to surround the sensor section S and the heater H, and communicates with an outside air intake port La for taking in outside air.

As shown in FIG. 4, the outside air intake port La is opened facing downward in the mounting posture described above. More specifically, in the mounting posture, a lower end C3a of the outer case C3 is located above a lower end C1a of the first inner case C1. As a result, an opening of the outer case C3 facing the connection port P side (measurement space side), that is, a downward-facing opening in the mounting posture, located outside an outer peripheral surface C1b of the first inner case C1 is formed as the annular outside air intake port La. In addition, this outside air intake port La is located above the lower end C1a of the first inner case C1 in the mounting posture.

The downstream flow path L2 is provided along a rear surface (the surface opposite to the electronic component mounting surface) of the circuit board B described above, and communicates with a vent Lb that discharges the outside air that has flown through the upstream flow path L1 and the downstream flow path L2 to outside. In the present embodiment, since the second inner case C2 has a U-shaped cross section as described above, the U-shaped downstream flow path L2 extends in the vertical direction in the mounting posture described above.

The vent Lb is formed in a lid 18 that closes an opening of the outer case C3 facing the side opposite to the measurement space, that is, an opening facing upward in the mounting posture. As shown in FIG. 3, the lid 18 forms a part of the second inner case C2 in the present embodiment and, for example, has insertion holes for an output terminal T for outputting a pressure value and a LAN cable. At a position avoiding these through holes, one or more vents Lb are formed. The lid 18 may be separated from the second inner case C2.

Further, in the present embodiment, one or more vents Lb are also provided on the upper portion of the outer case C3 in the mounting posture. Specifically, these vents Lb are provided at least at positions facing the outer peripheral surface of the second inner case C2. In order to exert the above-mentioned chimney effect more prominently, vents Lb are provided above the second inner case C2. Here, the outer case C3 has a rectangular cross section, and vents Lb are provided over a plurality of side surfaces thereof. However, the vents Lb may be provided, for example only on one side surface, or on all side surfaces.

In the vacuum gauge 100 of the present embodiment configured in this way, the flow path L through which the outside air flows is formed from between the first inner case C1 accommodating the heater H and the sensor section S whose temperature is controlled to a high temperature and the outer case C3 to between the second inner case C2 accommodating the circuit board B and the outer case C3. Accordingly, a large temperature difference can be generated between the upstream and the downstream of this flow path L.

As a result, an air density gradient is generated between the upstream and the downstream of the flow path L, and cold air can be pushed up toward the circuit board B by utilizing the chimney effect as described above. Accordingly, the circuit board B can be sufficiently cooled without applying air to the vacuum gauge 100 from outside.

Further, since the outside air intake port La of the flow path L faces downward in the mounting posture, it is easier to take in outside air and a stronger updraft can be generated, compared with the configuration in which the outside air intake port La faces sideways. Accordingly, the cooling effect of the circuit board B can be enhanced.

Further, since the outside air intake port La is located above the lower end C1a of the first inner case C1 in the mounting posture, the chamber X or a member near the chamber X, for example, do not hinder the intake of the outside air. Sufficient outside air can be taken in regardless of the mounting environment of the vacuum gauge 100.

In addition, since the circuit board B is supported along the inner peripheral surface C2a of the second inner case C2, a contact area of the downstream flow path L2 formed between the second inner case C2 and the outer case C3 and the circuit board B can be increased. The cooling effect of the circuit board B can be further improved.

In addition, since the first inner case C1 is made of a material having a lower thermal conductivity than the second inner case C2 and the outer case C3, the first inner case C1 exerts the heat retaining function upon the sensor section S, and the second inner case C2 and the outer case C3 can also exert the heat dissipation function. These functions also enable the circuit board B to be cooled while controlling the temperature of the sensor section S to a high temperature.

In addition, since the vents Lb are provided on the lid 18, which closes the upper end opening of the outer case C3, and the upper portion of the outer case C3, the chimney effect can be fully exerted.

The present invention is not limited to the above embodiment.

For example, in the above embodiment, the heat insulation module 3 is provided so as to separate the sensor module 1 and the main body module 2 with a predetermined distance. However, for example, the heat insulation module 3 may be omitted as long as transfer of the heat generated in the sensor module 1 to the main body module 2 can be sufficiently blocked. In other words, the sensor module 1 and the main body module 2 may be provided adjacent to each other.

Further, in the above embodiment, the second inner case C2 has a U-shaped cross section and the circuit board B is bent into the U-shape. However, the circuit board B may, for example, have a rectangular cross section, a polygonal cross-section, or a part thereof.

Figure 5:
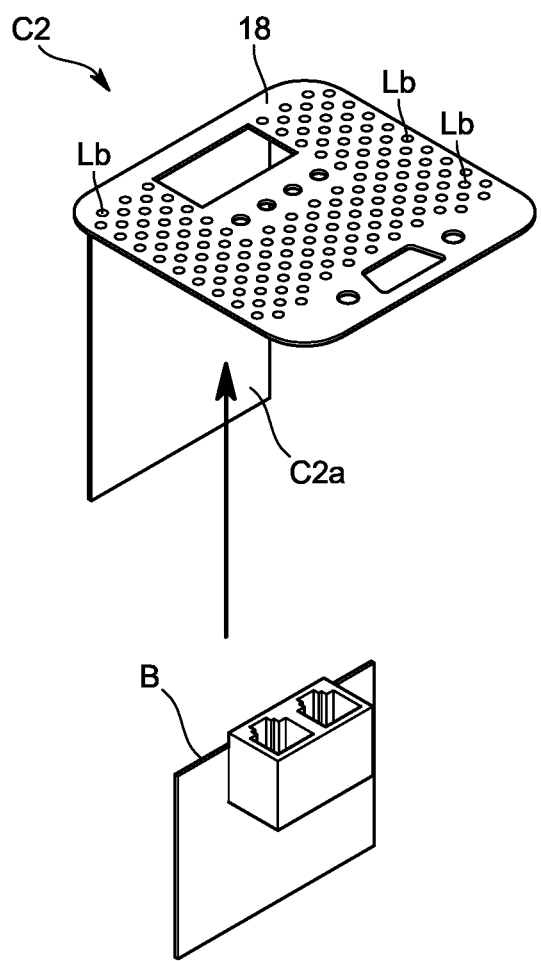
FIG. 5 is a schematic perspective view showing a circuit board according to another embodiment.

Further, as shown in FIG. 5, the circuit board B may have a flat shape without being bent and provided along the inner peripheral surface C2a of the second inner case C2. In this case, since the second inner case C2 only needs to support this flat circuit board B, the second inner case C2 does not necessarily have a tubular shape, and may have a flat shape. In other words, the second inner case C2 does not need to accommodate the circuit board B, and only needs to, for example, support the circuit board B.

The vents Lb are preferably provided on both the lid 18 that closes the upper end opening of the outer case C3 and the upper portion of the outer case C3, but the vents Lb may be provided on at least one of them.

The first inner case C1, the second inner case C2, and the outer case C3 are not limited to the materials described in the above embodiment. For example, the first inner case C1 is not limited to SUS as long as the material has a lower thermal conductivity than the second inner case C2 and the outer case C3. The second inner case C2 and the outer case C3 may also be made of different materials.

The sensor section S is not limited to the diaphragm type pressure detection mechanism, and may be, for example, an ionization type pressure detection mechanism, or a mechanism that detects a pressure based on the relationship between the frequency and pressure of the structure.

The measurement space of the vacuum gauge is not limited to the inside of the vacuum chamber X where film formation is performed. Other spaces may be determined as the measurement space.

Various modifications of the embodiments and combinations of parts of the embodiments may be performed as long as the gist of the present invention is not violated.

REFERENCE SIGNS LIST

100 vacuum gauge
X vacuum chamber
1 sensor module
2 main body module
S sensor section
H heater
B circuit board
C1 first inner case
C2 second inner case C3 outer case
L flow path
La outside air intake port
Lb vent

What is claimed is:

1. A vacuum gauge comprising:
a sensor section that communicates with a measurement space via a connection port and outputs an output signal according to a pressure in the measurement space;
a heater provided around the sensor section to heat the sensor section;
a circuit board arranged on a side opposite to the connection port with respect to the sensor section;
a first inner case that accommodates the sensor section and the heater;
a second inner case that accommodates the circuit board; and
an outer case that surrounds the first inner case and the second inner case and forms a flow path, through which outside air flows, together with the first inner case and the second inner case.

2. The vacuum gauge according to claim 1, wherein when the vacuum gauge is in a mounting posture in which the circuit board is mounted so as to be located above the sensor section, an outside air intake port of the flow path faces downward.

3. The vacuum gauge according to claim 2, wherein the outside air intake port is located above a lower end of the first inner case in the mounting posture.

4. The vacuum gauge according to claim 3, wherein
a lower end of the outer case is located above the lower end of the first inner case in the mounting posture, and
a downward-facing opening of the outer case, located outside an outer peripheral surface of the first inner case, is formed as the outside air intake port.

5. The vacuum gauge according to claim 1, wherein
the outer case has a tubular shape with a rectangular cross section or a polygonal cross section,
the second inner case is provided along a plurality of sides of the outer case, and
the circuit board is supported along an inner peripheral surface of the second inner case.

6. The vacuum gauge according to claim 1, wherein the first inner case is made of a material having a lower thermal conductivity than the second inner case and the outer case.

7. The vacuum gauge according to claim 1, wherein the outer case has a tubular shape, and a vent that discharges outside air flowing through the flow path to outside is provided in a lid that closes an opening, of the outer case, facing a side opposite to the connection port.

8. The vacuum gauge according to claim 7, wherein the vent that discharges outside air flowing through the flow path to outside is further provided in the outer case at a position facing the second inner case.

9. A vacuum gauge comprising:
a sensor section that communicates with a measurement space via a connection port and outputs an output signal according to a pressure in the measurement space;
a heater provided around the sensor section to heat the sensor section;
a circuit board arranged on a side opposite to the connection port with respect to the sensor section; and
an outer case that forms a flow path, through which outside air flows, around the sensor section and the circuit board.

* * * * *